United States Patent [19]

Itoh et al.

[11] Patent Number: 4,860,282
[45] Date of Patent: Aug. 22, 1989

[54] SYSTEM FOR TRANSMITTING AUXILIARY SIGNAL IN A MULTIPLEX COMMUNICATION SYSTEM

[75] Inventors: Hideaki Itoh, Chofu; Takayuki Ozaki, Tochigi, both of Japan

[73] Assignee: Fujitsu Limited, Kawasaki, Japan

[21] Appl. No.: 289,436

[22] Filed: Dec. 22, 1988

Related U.S. Application Data

[63] Continuation of Ser. No. 51,385, May 19, 1987, abandoned.

[30] Foreign Application Priority Data

May 19, 1986 [JP] Japan .................................. 61-115362
May 27, 1986 [JP] Japan .................................. 61-122013

[51] Int. Cl.$^4$ ............................................. H04J 3/08
[52] U.S. Cl. ........................................ 370/55; 370/97; 370/110.1
[58] Field of Search .................... 370/110.1, 111, 97, 370/55, 20, 26, 75, 76, 87

[56] References Cited

U.S. PATENT DOCUMENTS

| | | | |
|---|---|---|---|
| 3,939,407 | 2/1976 | Bickford | 370/55 |
| 4,434,485 | 2/1984 | Huffman et al. | 370/55 |
| 4,667,319 | 5/1987 | Chum | 370/97 |

Primary Examiner—Douglas W. Olms
Assistant Examiner—Melvin Marcelo
Attorney, Agent, or Firm—Staas & Halsey

[57] ABSTRACT

In an auxiliary signal transmission system used in a multiplex communication system, a first auxiliary signal which is necessary in a transmitting terminal and a receiving terminal is transmitted directly without processing in an intermediate repeater station, and a second auxiliary signal which is necessary in at least one intermediate repeater station is processed in the intermediate repeater station, and thereafter, is transmitted to the receiving terminal. Therefore, transmission discontinuity in the system caused by a fault in the intermediate repeater station can be prevented.

4 Claims, 16 Drawing Sheets

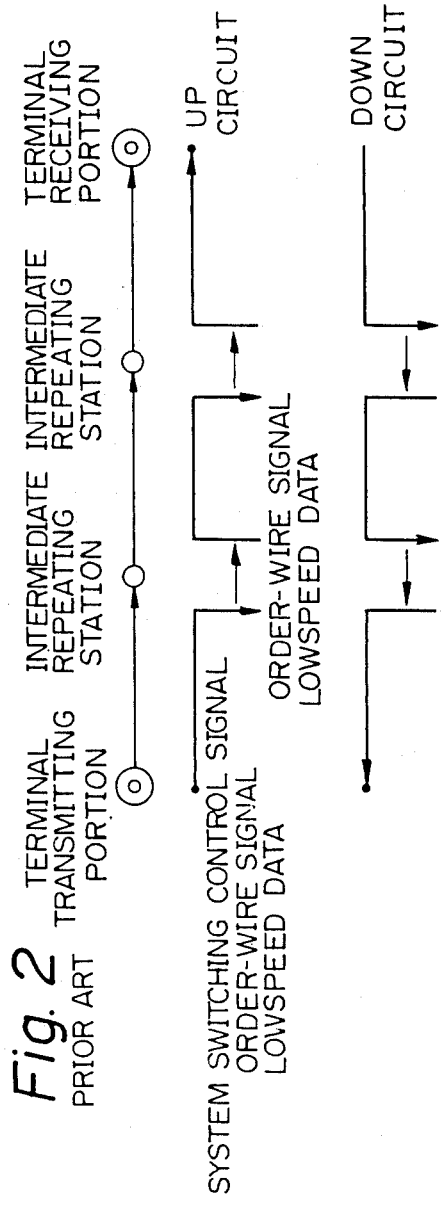

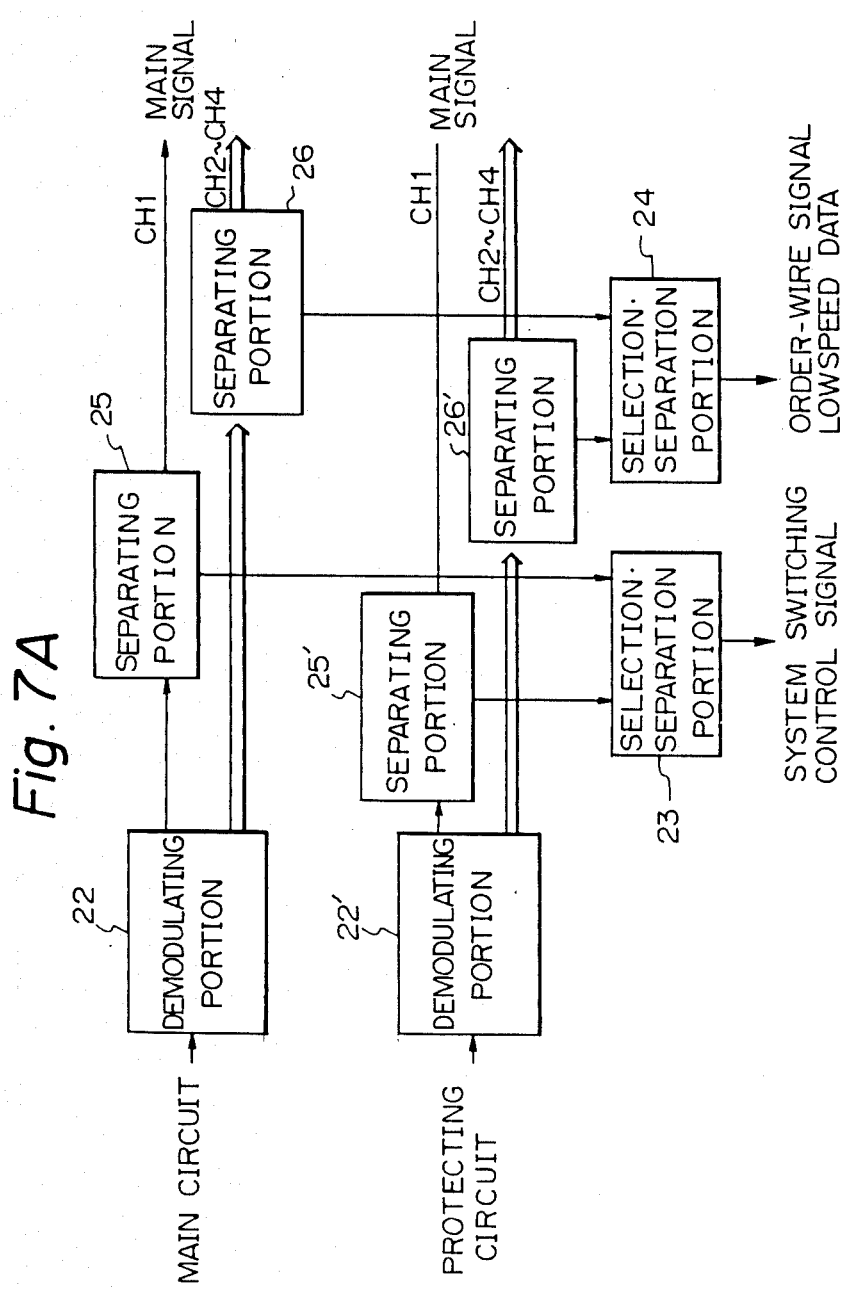

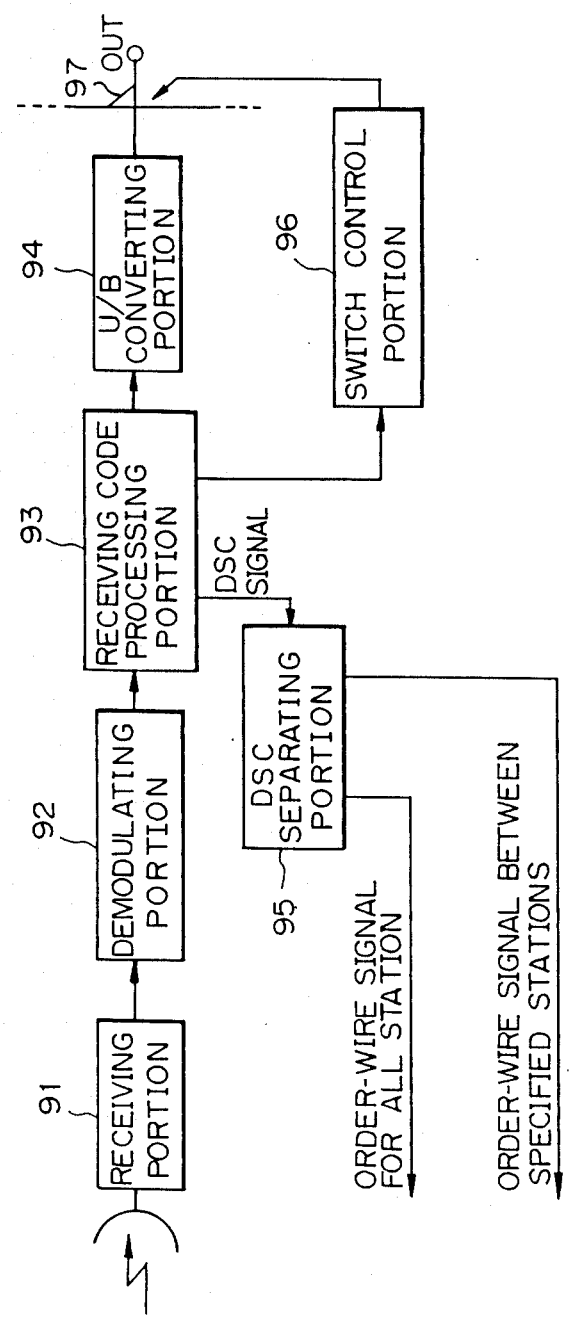

SYSTEM FOR TRANSMITTING AUXILIARY SIGNAL IN A MULTIPLEX COMMUNICATION SYSTEM

This is a continuation of co-pending application Ser. No. 051,385 filed on May 19, 1987, now abandoned.

BACKGROUND OF THE INVENTION

1. Field of the Invention

The present invention relates to an improvement of an auxiliary signal transmission system used, for example, in a digital microwave multiplex radio communication system.

To carry out the transmission of a digitized order signal, low speed data or a system switching control signal (generically known as the auxiliary signal) between the terminal office and the intermediate repeater station, between the intermediate stations, and between the terminal offices, by using the digital microwave multiplex radio system, the system is used for inserting these signals into a main signal (sometimes known as a digital service channel and hereinafter referred to as DSC), and in the intermediate repeater station, signal processing is carried out in a signal processing portion, to take out or repeat the order-wire signal or the low speed data from the received signal. In this case, desirably the auxiliary signal transmission system prevents problems in the system even if a problem occurs in the intermediate repeater station.

2. Description of the Related Arts

In a digital microwave multiplex radio system which transmits the auxiliary signal between the terminal office and the intermediate repeater station, or between intermediate repeater stations, if the transmission capacity is small, a system which performs a shallow frequency modulation of a carrier wave by this signal, to carry out an analogical transmission (such a system is known as an analog service channel) is used. However, for example, when the transmission capacity is large, such as in a digital multi-value quadrature amplitude modulation system, the purity of the regenerated carrier wave should be maintained at high degree, to ensure that any deterioration of an error rate of the main signal as kept as small as possible, and therefore, the above-mentioned service channel can not be used. Accordingly, a DSC system in which all digitized signals, including the order signal, are included in the main signal and are transmitted, is used.

There are four kinds of signals that can be transmitted by the DSC, i.e., the DSC synchronizing signal, the system switching control signal, the order-wire signal, and low speed data. The order-wire signal and low speed data are necessary in both the intermediate repeater station and the terminal office, but the system switching control signal is necessary only in the terminal office.

The system switching control signal is used to prevent problems in the main circuit and to maintain the quality of the main signal, and is the most important among the signals transmitted by the DSC.

On the other hand, in the signal processing portion in the intermediate repeater station, as mentioned already, the order-wire signal and the low speed data are taken out only after all of the other DSC signals are taken out. Therefore, if a fault occurs in this portion, a problem arises in that the system switching control signal can not be repeated to the receiving terminal office, and thus problems arise in the operation of the main circuit.

SUMMARY OF THE INVENTION

An object of the present invention is to provide an auxiliary signal transmission system to be used in the multiplex communication system which can prevent problems in the system even if a problem arises in the intermediate repeater station.

The above-mentioned object is achieved by providing an auxiliary signal transmission system to be used in a multiplex communication system which includes a transmitting terminal, as least one intermediate repeater stations, and a receiving terminal, wherein the multiplex transmits system communicates, together with a main signal, a first kind of auxiliary signal such as a system switching control signal which is required only in the transmitting terminal and the receiving terminal and a second kind of auxiliary signal such as an order-wire signal, low speed data, etc., which is required in the at least one intermediate repeater station. The multiplex communication system is formed by a plurality of channels, each of which is formed by a plurality of time slots, for transmitting the auxiliary signals together with main signals and comprises means for inserting the first kind of auxiliary signal separately from the second kind of the auxiliary signal in the main signal in the transmitting terminal; means for transmitting the first kind of auxiliary signal without processing the second kind of auxiliary signal in the intermediate repeater station, and means for processing the second kind of auxiliary signal in the intermediate repeater station, and after processing the first kind of auxiliary signal, transmitting the second kind of auxiliary signal from the intermediate repeater station to the receiving terminal or the next intermediate repeater station.

Further features and advantages of the present invention will be apparent from the ensuing description with reference to the accompanying drawings to which, however, the scope of the invention is in no way limited.

BRIEF DESCRIPTION OF THE DRAWINGS

FIG. 1 is a diagram showing a format used in a digital multiplex modulation system;

FIG. 2 is a diagram showing a construction of a conventional system;

FIGS. 7A and 7B are diagrams showing one embodiment of a receiving terminal of the present invention;

FIGS. 10A-10C are diagrams showing another embodiment of the system according to the present invention.

DESCRIPTION OF THE PREFERRED EMBODIMENTS

FIG. 1 shows an example of a frame format of a digital multi-value quadrature amplitude modulation system having 16 values (hereinafter referred to as 16 value QAM modulation system).

In FIG. 1, $F_{11} \sim F_{1n}$, $F_{21} \sim F_{2n}$, $F_{31} \sim F_{3n}$, $F_{41} \sim F_{4n}$ show main signal frame synchronizing signals, "M" shows a main signal sequence, "C" shows a stuff control signal, "P" shows a parity bit, and "$D_1 \sim D_3$" show a DSC signal, respectively.

In FIG. 1, the DSC signal or the stuff control signal or the parity bit and main signal sequences are inserted between the main signal frame synchronizing signals, which are repeated at a constant period. Note, in a 64 value QAM modulation system, 6 channels are used (hereinafter abbreviated as CH), and in a 256 value QAM modulation system 8CH are used.

FIG. 2 is a diagram showing an example of a construction of a conventional circuit.

As shown in FIG. 2, when a terminal office transmitting portion and a terminal office receiving portion are provided at two ends and an intermediate repeater station is provided therebetween, the intermediate repeater portion extracts all of the DSC signals $D_1 \sim D_3$, in order to take out the order-wire signal and the low speed data included in the $D_1 \sim D_3$ portion in the example of the frame format of FIG. 1, the orderwire signal and the low speed data signal are separated therefrom, and these signals are again inserted to the main signal, as a repeat of the procedure.

Figure 3A:
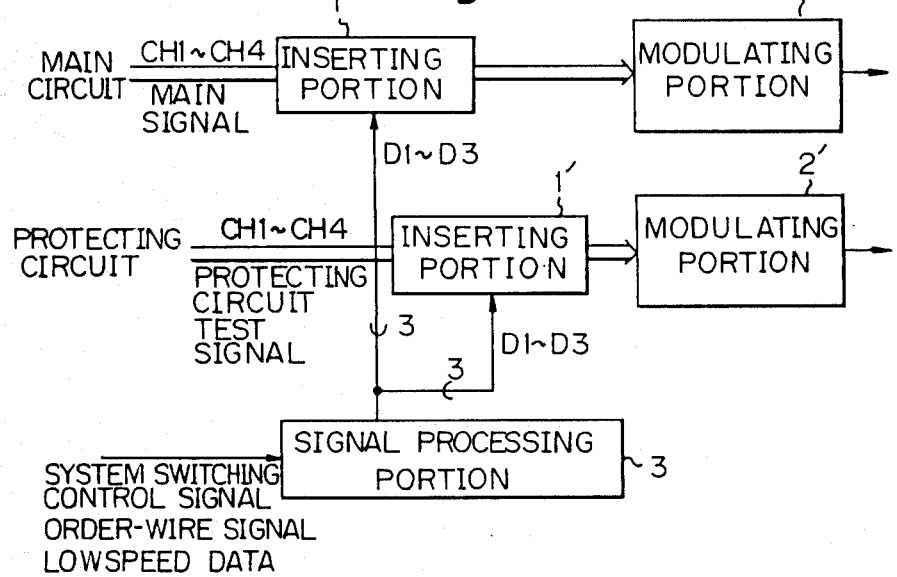
FIGS. 3A, 3B, and 3C are block diagrams showing the operation of the conventional system.
Figure 3C:
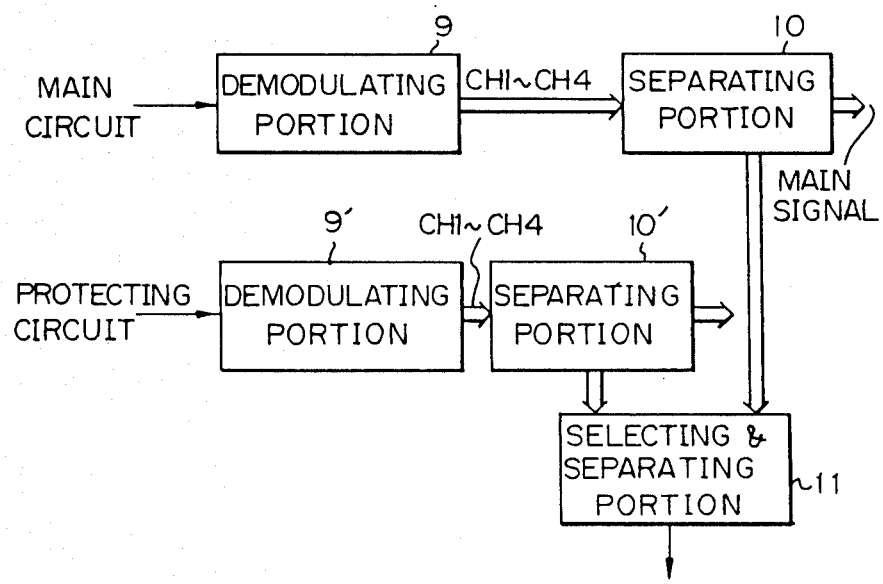
Figure 3B:
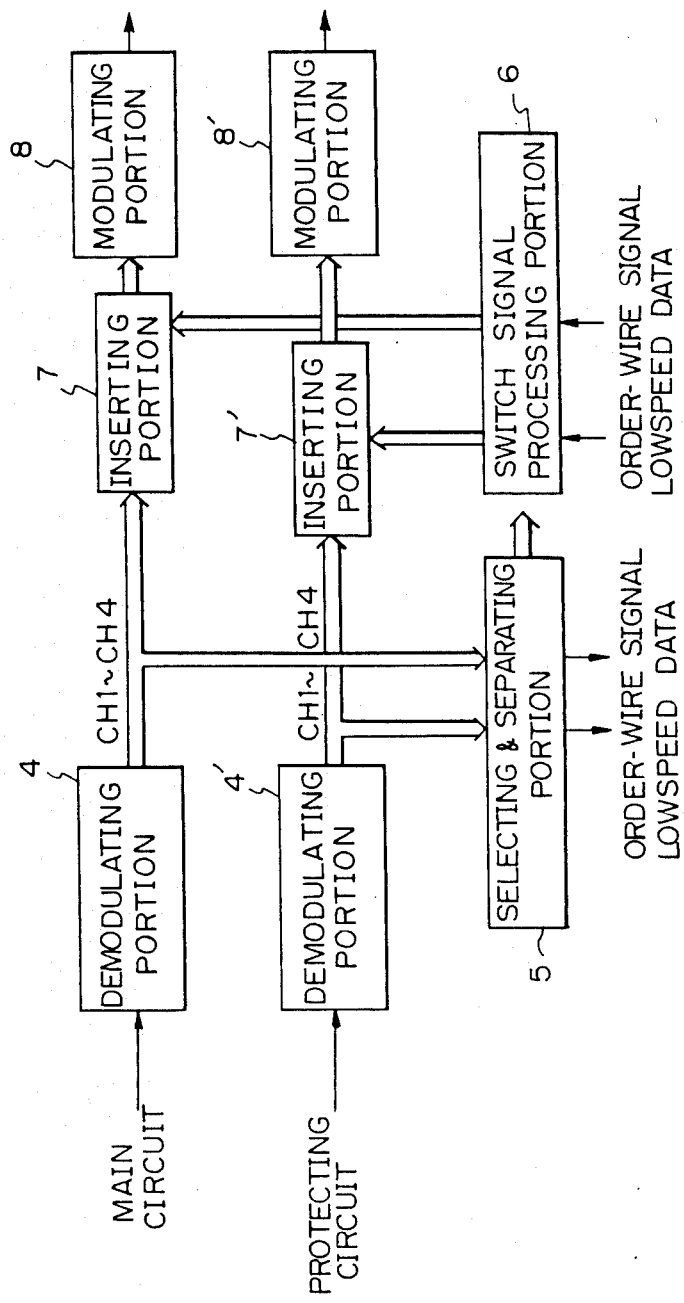

FIGS. 3A~3C are block diagrams of an apparatus for carrying out the operation of the conventional system; wherein FIG. 3A shows a terminal office transmitting portion, FIG. 3B an intermediate repeater station, and FIG. 3C a terminal office receiving portion. Hereinafter, the operation of the conventional system will be explained, with reference to FIGS. 3A~3C and on the assumption that the system has 4 channels.

In FIG. 3A, a main signal whose transmission speed has been accelerated at a velocity converting portion (not shown in the drawing) and gaps provided therein, is input to a main circuit. Further, a frame synchronizing signal is added to a system switching control signal, an order-wire signal, and low speed data in a signal processing portion 3, converted into three parallel signals, output along three channels, and thereafter, inserted into the gaps in the main signal at an inserting portion 1, so to obtain a 4CH signal having the format shown in FIG. 1. This signal is supplied to a modulating portion 2, wherein the carrier wave is modulated, and the modulated waveform as a 16 value QAM is sent to a next office.

A protecting circuit is also processed in the same way as the main circuit mentioned above, and the 16 value QAM modulated waveform is sent via an inserting portion 1' and a modulating portion 2' to the next office. Note, in this case a protecting circuit test signal is used instead of the main signal.

In FIG. 3B, the 16 value QAM modulated waveform applied to demodulating portions 4, 4' via a main circuit and a protecting circuit is demodulated and a signal having a format shown in FIG. 1 is obtained and applied to a selecting and separating portion 5, so that the $D_1 \sim D_3$ portions transmitted by the main circuit and the protecting circuit are taken out and an orderwire signal and low speed data signal having a good S/N ratio are obtained.

Then, the extracted order signal and low speed data are processed together with the system switching signal in the signal processing portion 6, in the same way as mentioned above, and are inserted in the inserting portion 7 and 7, into the portions $D_1 \sim D_3$ shown in FIG. 1. Thereafter, the carrier wave is modulated in the modulating portions 8 and 8', and the 16 value QAM modulated waveform is sent to a next office.

In FIG. 3C, the 16 value QAM modulated waveform from the intermediate repeater station is demodulated in the demodulating portions 9 and 9', to obtain a signal having the format shown in FIG. 1. This signal is separated in the separating portions 10 and 10' into the main signal, the protecting circuit test signal, and the portions $D_1 \sim D_3$, and thereafter, as in FIG. 3B, the portions $D_1 \sim D_3$ having a good S/N ratio are selected in a selecting and separating portion 11, and the system switching control signal, the order-wire signal, and the low speed data signal are obtained therefrom.

In the example shown above, the signal transmitted by using the DSC is formed by 4 kinds of signals, i.e., the DSC synchronizing signal, the system switching control signal, the order-wire signal, and the low speed data signal. The order-wire signal and the low speed data signal are used in both the intermediate repeater station and the terminal offices, but the system switching control signal is used only in the terminal offices.

The system switching control signal is used to prevent problems in the main circuit, and to maintain the quality of the main signal, and is the most important among the signals transmitted by the DSC.

In the signal processing portion in the intermediate repeater station, as mentioned above, the order-wire signal and the low speed data signal are taken out only after all of the DSC signals are taken out. Therefore, if a fault occurs in this portion, a problem arises in that the system switching control signal can not be repeated to the terminal office, and therefore, problems in the main circuit can not be prevented.

Figure 4:
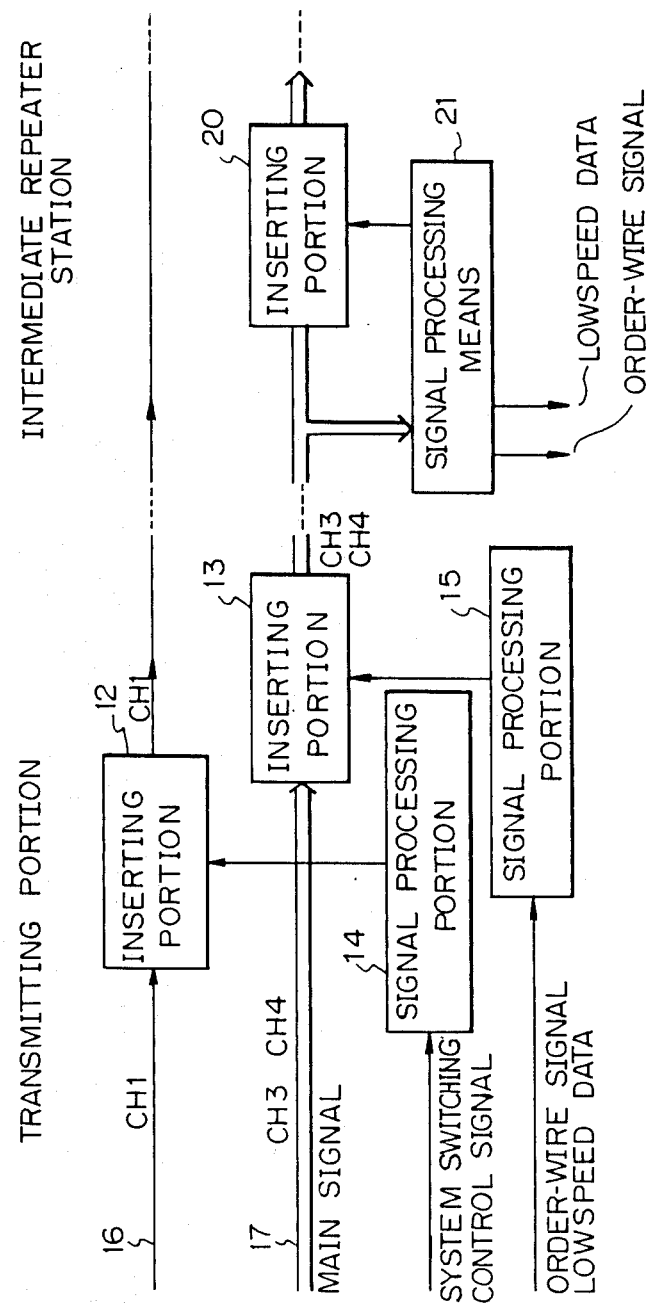
FIG. 4 is a block diagram showing the principle of a system according to the present invention.

The above-mentioned problem can be solved by providing an auxiliary signal transmission system in which, as shown in FIG. 4, in the transmitting portion, a digital service channel synchronizing signal is added to the system switching control signal in a signal processing portion 14, and to the order-wire signal and the low speed data in a signal processing portion 15, respectively, and thereafter, is inserted via inserting portion 12, 13 into a main signal having a specified channel ($CH_1$) 16 or another channel ($CH_3$, $CH_4$) 17, to be output, and in an intermediate repeater station, the signal of the specified channel ($CH_1$) 16 is directly repeated without signal processing, and the order-wire signal and the low speed data signal in the other channel ($CH_3$, $CH_4$) 17 are taken out by signal processing in a signal processing means 21, or after a repeated signal process processing, are inserted via the inserting portion 20 into the main signal of the other ($CH_3$, $CH_4$) channel 17, to be repeated.

As shown in FIG. 4 of the present invention, a DSC synchronizing signal and a system switching control signal are inserted via an inserting portion 12 into a main signal of a specified channel 16, and the DSC synchronizing signal, and an order-wire signal and a low speed data signal are inserted via an inserting portion 13 into a main signal of another ($CH_3$, $CH_4$) channel 17. In the intermediate repeater station, the signal of the specified channel 16 is repeated without processing, and only the order-wire signal and the low speed data signal of the other (CH3, CH4) channel 17 are processed and taken out in a signal processing means 21, or again processed and inserted via an inserting portion 20 into this channel 17, to be repeated.

That is, since the system switching control signal is not processed in the intermediate repeater station, if an obstacle arises in the signal processing portion, the system switching control signal is transmitted to a terminal receiving portion, and thus the occurrence of a fault in the system can be prevented.

Figure 5A:
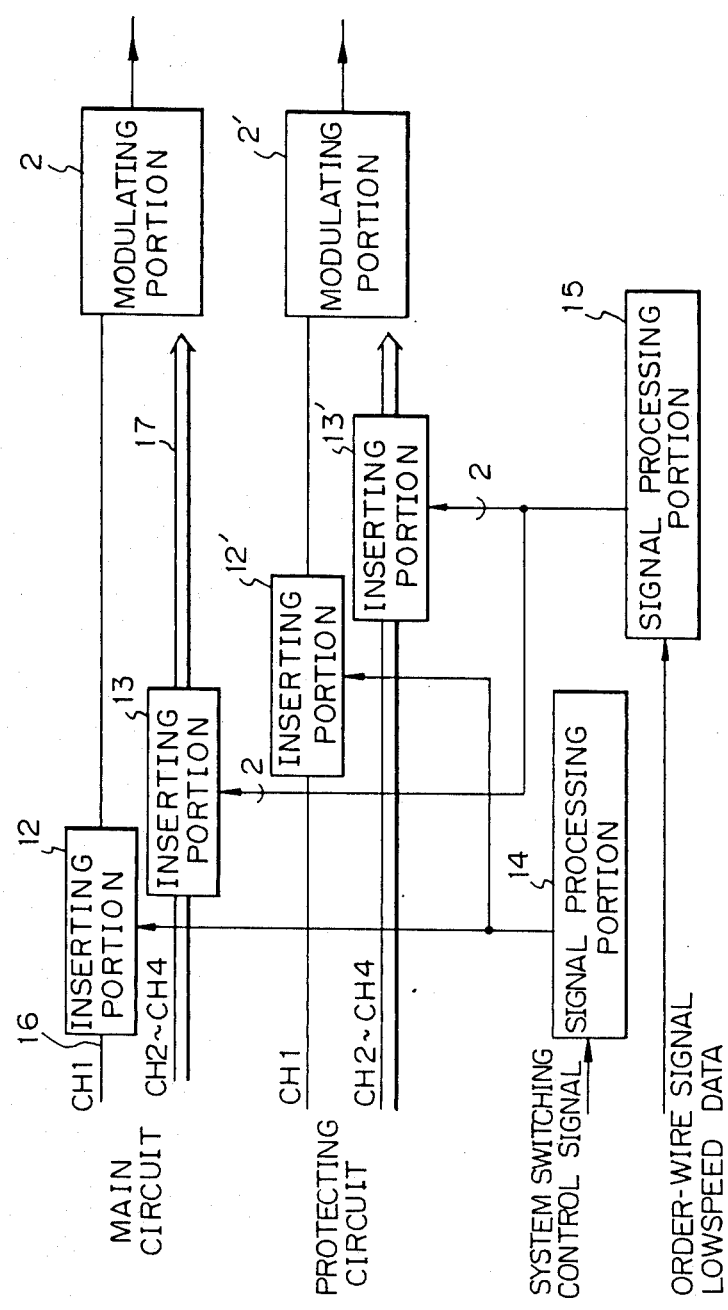
FIGS. 5A to 5D are diagrams showing one embodiment of a transmitting terminal of the present invention.
Figure 5B:
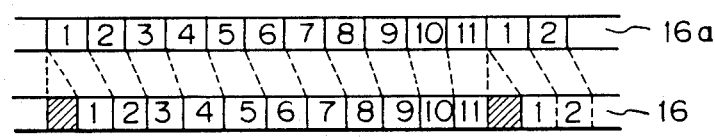
Figure 5C:
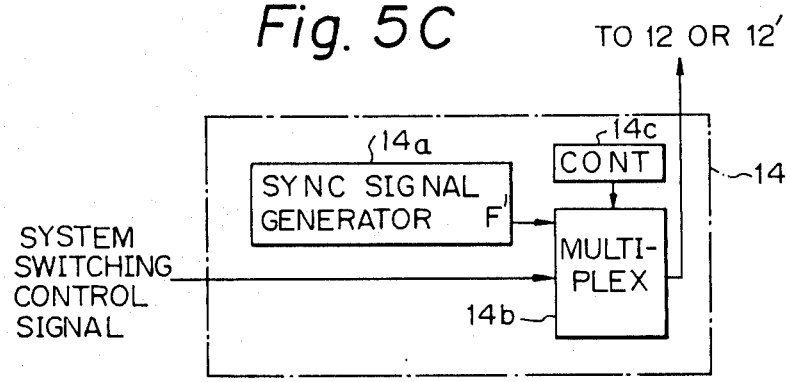
Figure 5D:
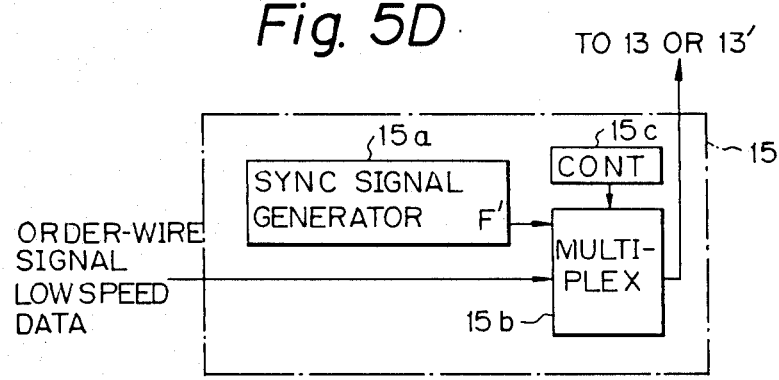
Figure 6A:
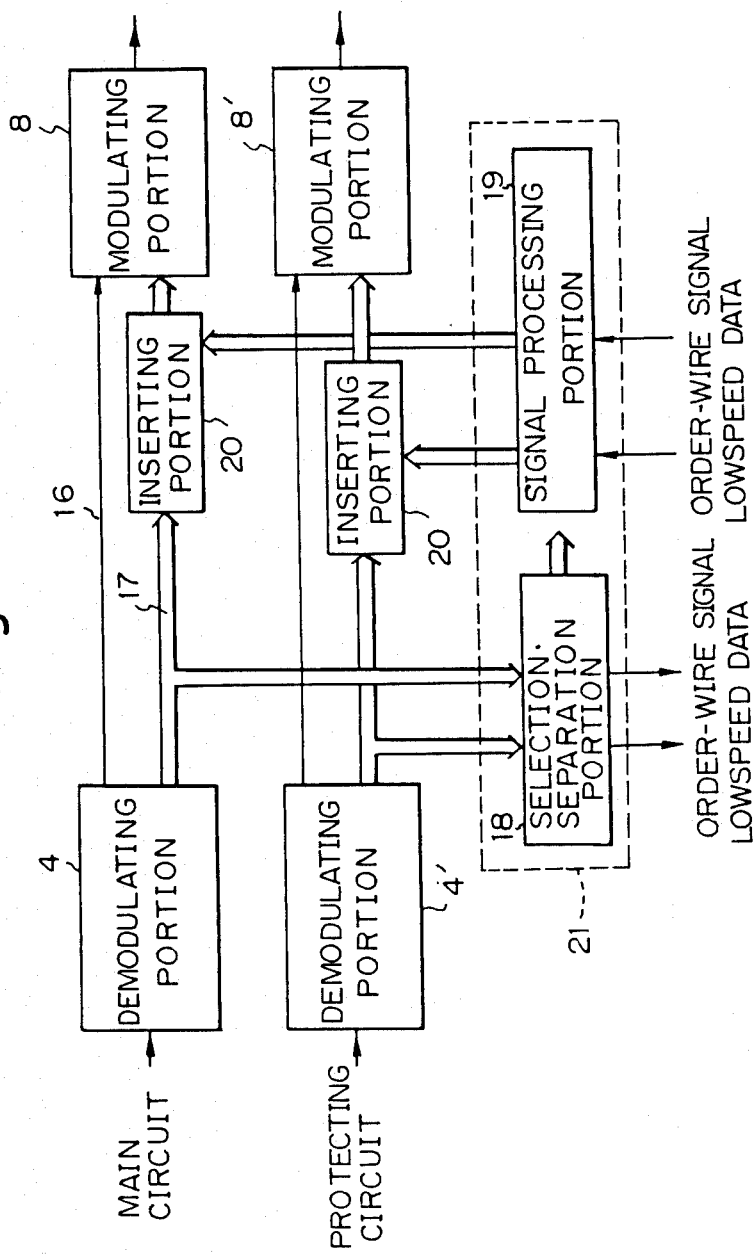
FIGS. 6A to 6C are diagrams showing one embodiment of an intermediate repeater station of the present invention.
Figure 6B:
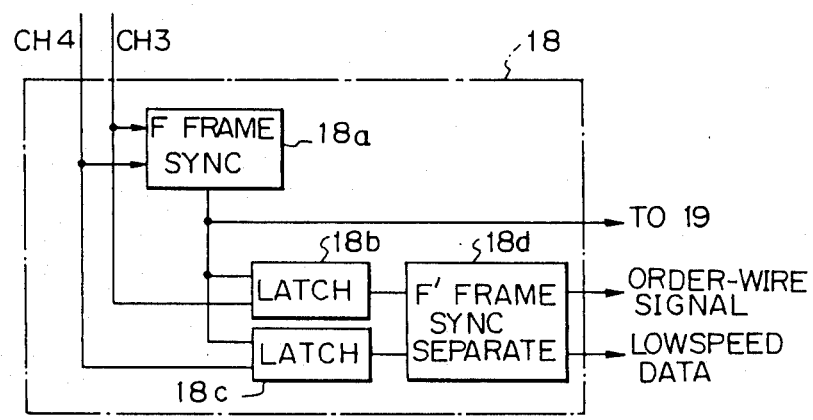
Figure 6C:
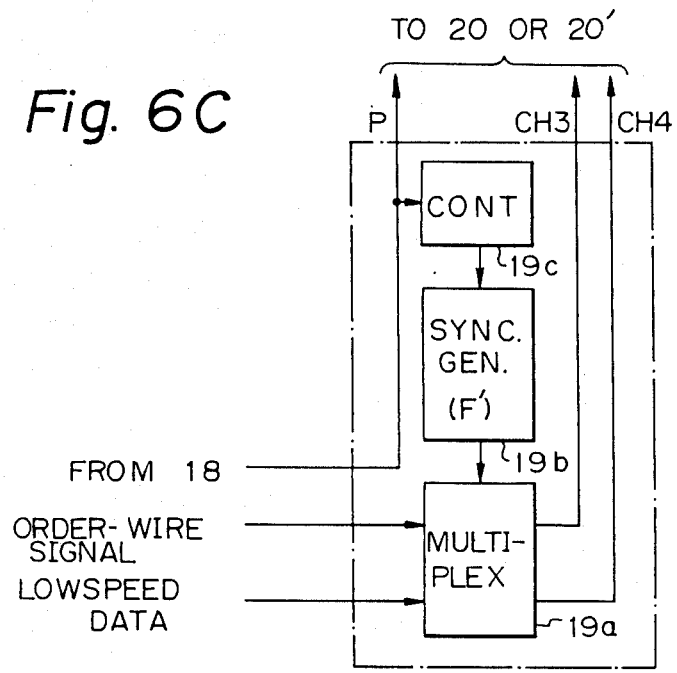
Figure 7B:
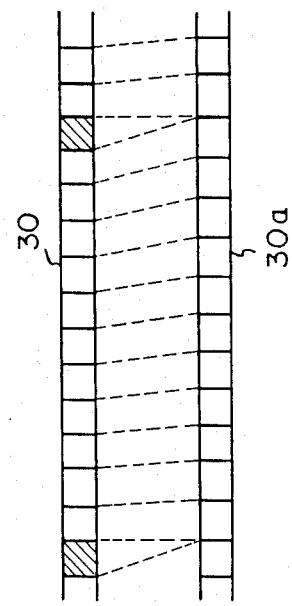

FIGS. 5A~5D, 6A~6C, and 7A~7B are block diagrams of the apparatus for carrying out the present invention, wherein FIGS. 5A~5D are block diagrams of a terminal transmitting portion; FIGS. 6A~6C are block diagrams of an intermediate repeater station; and FIGS. 7A and 7B are block diagrams of a terminal receiving portion. Note, throughout the drawings the same symbols designate the same elements. Hereinafter, assuming that the number n of the channels is 4, the operation of FIGS. 5A~5D, 6A~6C, and 7A, 7B will be explained with reference also to FIG. 1.

In FIG. 5A, a synchronizing signal is added in a signal processing portion 14 to the system switching control signal input from an external source, and the system switching control signal is inserted into a specified channel, for example, the portion $D_1$ of channel 1 in FIG. 1.

Further, the order-wire signal and the low speed data signal input to the signal processing portion 15 are added to a frame synchronizing signal, further converted into parallel signals for two channels, and thereafter, inserted into portions $D_2$, $D_3$ of CH3, CH4 in FIG. 1. The 4CH signals are then modulated as a carrier wave in a modulation portion 2, and a 16 value QAM modulation waveform is output to a next office. Similarly, in a protecting circuit, the order-wire signal and the low speed data signal are inserted via an inserting portion 12', 13' into the same position in the frame format.

In FIG. 5A, the main signals in CH1 and CH2~CH4 are applied to the inserting portions 12 and 13 via a frequency converter (not shown in the drawing) in which gaps are provided in the main signal. In FIG. 5B, reference numeral 16 denotes a signal applied to the inserting portion 12 or 13, and reference numeral 16a denotes a signal applied to the frequency converter mentioned above.

FIG. 5C is a detailed block diagram of the signal processing portion 14, in which a sync. signal generator 14a generates a sync. signal F', and the system switching control signal is combined with the sync. signal F' in a multiplexer 14b which is controlled by a controller 14C. The output of the multiplexer 14b is supplied to the gap corresponding to the portion $D_1$.

FIG. 5D is a detailed block diagram of the signal processing portion 15. The function of the circuit shown in FIG. 5D is very similar to that of the circuit shown in FIG. 5C. That is, the order-wire signal and the low speed data signal are added the sync signal generated in a sync. signal generator 15a in a multiplexer 15b under the control of the controller 15c, and the output of the multiplexer 15b is supplied to the gap corresponding to the portions $D_2$, $D_3$ in CH3 and CH4

Next, in FIG. 6A, the 16 value QAM modulation waveform transmitted via the circuit is demodulated in demodulating portions 4, 4', and a signal having a format shown in FIG. 1 is taken out. Note, the CH1 signal is directly input to modulating portions 8, 8'

The CH2~4 signals in the other channel 17 are applied to a selection/separation portion 18 in the signal processing means 21 and portions $D_2$ or $D_3$ having a good S/N ratio are selected, and thereafter, the signal is separated into the order-wire signal and the low speed data signal, to be output.

Further, th- order-wire signal or the low speed data signal which were taken out or sent from the intermediate repeater station, are added to the DSC synchronizing signal in the signal processing portion 19, as in the terminal office, and thereafter, inserted into portions $D_2$, $D_3$ of the frame format shown in FIG. 1 in the inserting portion 20, 20', to be applied to the modulating portions 8, 8'. The 16 value QAM modulation waveform is then repeated.

FIG. 6B is a block diagram of one example of the selection/separation portion 18 in FIG. 6A. In FIG. 6B, CH3 and CH4 input signals are supplied to a circuit 18a in which the frame sync. signals are extracted and the extracted sync. siignal is supplied together with the input signals to latch circuits 18b and 18c and further supplied to the signal processing portion 19. The outputs of the latch circuits 18b and 18c are supplied to the F' frame sync. separating circuit 18d, in which the frame signal F' is removed and supplied to an external circuit such as a telephone circuit or a data circuit.

FIG. 6C is a block diagram of one example of the signal processing circuit 19 shown in FIG. 6A. As shown in FIG. 6C, the external signals, that is, the order-wire signal and the low speed data signals, are multiplexed in a multiplexer 19a with a sync. signal generated in a sync. generated 19b, under the control of the control circuit 19c controlled by the output of the circuit 18a, and supplied to the inserting portion 20.

Next, in FIG. 7A, a signal having the frame format shown in FIG. 1 is demodulated in the demodulating portion 22, 22' separated in separation portion 25, 25' and the CH1 signal is supplied to a separation selection portion 23 so that a system switching control signal can be taken out. Further, the CH2~CH4 signals are added in the selection separation portion 24 so that the order-wire signal and the low speed data are taken out. The outputs, including the main signal, of separating circuits 25, 26, 25', 26' are supplied respectively to a frequency converter (not shown in the drawings) and the insertion gaps are removed. In FIG. 7B, reference numeral 30 denotes the output signal of the separating portion and reference signal 30a denotes the output of the frequency converter explained above.

By performing the signal processing shown in FIG. 5A to FIG. 7B, if a fault occurs in the signal processing means 21 of the intermediate repeater station, problems in the system can be prevented without affecting the switching control signal.

Figure 8:
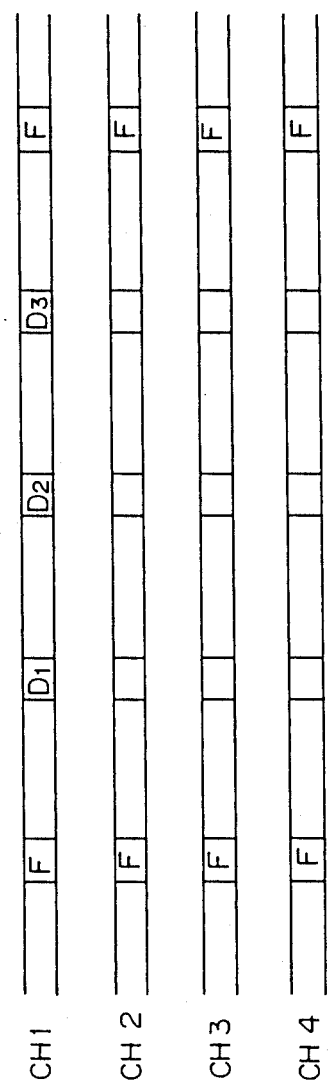
FIG. 8 is a diagram showing a format of another embodiment of the present invention.

FIG. 8 is another example of a frame format of a digital multi-value quadrature amplitude modulation system in the case of the 16 value QAM system. In FIG. 8, "F" is a main signal frame synchronizing signal and "$D_1$~$D_3$" are DSC signals. The difference between FIG. 8 and FIG. 1 is that the DSC signals are all inserted in the same channel, as shown in FIG. 8.

Figure 9A:
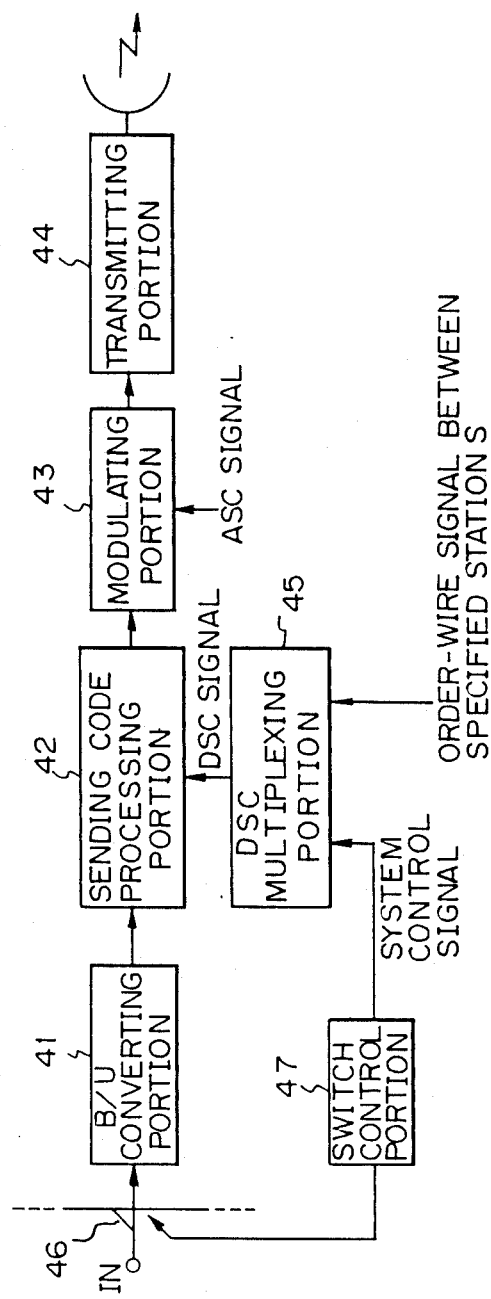
FIGS. 9A-9C are diagrams showing examples of the conventional system.
Figure 9B:
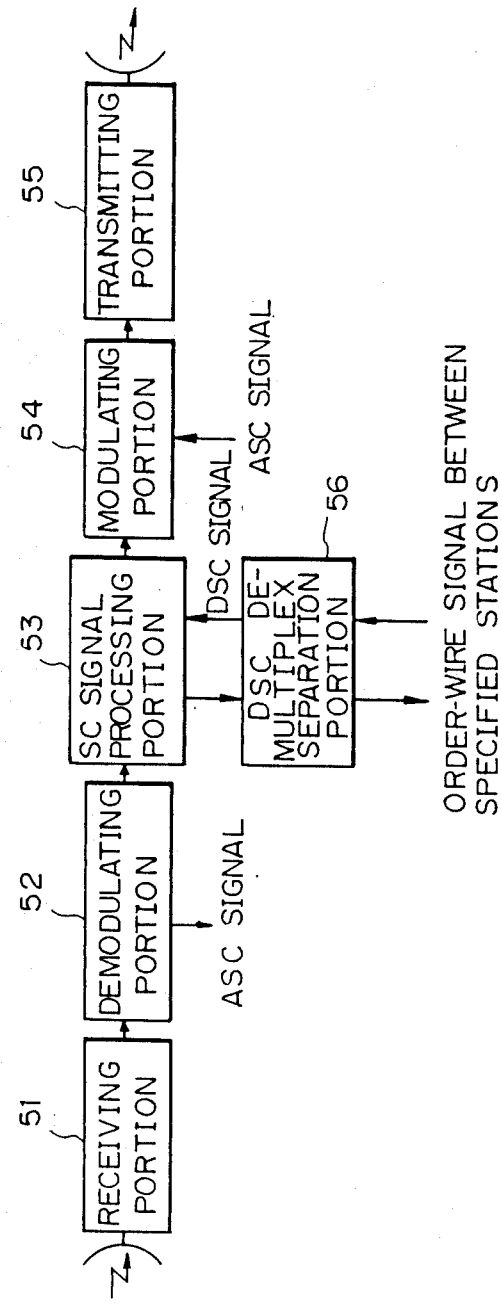
Figure 9C:
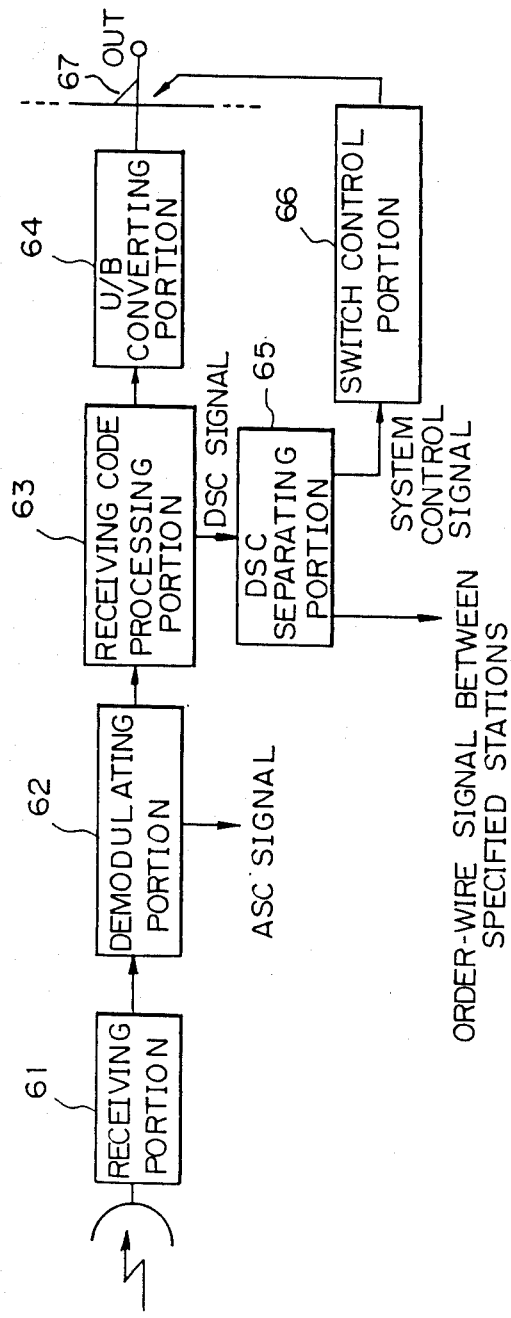

The system using the format shown in FIG. 8 was conventionally performed as shown in FIGS. 9A~9C.

FIGS. 9A~9C are block diagrams of a conventional signal transmission system.

In the transmitting station shown in FIG. 9A, a bipolar/unipolar converting (hereinafter called B/U conversion) portion 41 converts an input bipolar signal IN to a unipolar signal, inserted codes such as an error correcting code and a digital service channel (DSC) signal are processed in a sending code processing portion 42, multi-value quadrature modulation (hereinafter called multi-value QAM) is carried out in a modulating portion 43, and the output of the modulating portion 43 is transmitted from a transmitting portion 44. Further, a DSC multiplexing portion 45 controls a switch 46, and multiplexes a system control signal from the switch control portion 47 switching a main circuit and a protecting circuit and an order-wire signal used between specified stations so as to form one signal.

A repeater station shown in FIG. 9B receives in a receiving portion 51 the signal from an upstream station, and in a demodulating portion 52, demodulates the multi-value QAM signal into a two value digital signal and demodulates the ASC signal which containing a FM modulated a carrier wave. Next, in an SC signal processing portion 53, the repeater station branches and inserts a DSC signal, and in a modulating portion 54, the two value digital signal is modulated together with the ASC signal and sent to a transmitting portion 55. Further, a DSC demultiplex separation portion 56 demultiplexes and separates only the order signal between specified stations allocated to the station, among the multiplexed DSC signals.

A receiving terminal station shown in FIG. 9C receives, in a receiving portion 61, the digital signal and the ASC signal which are demodulated in a demodulating portion 62. A receiving signal processing portion 63 performs code processing such as separation of an error correction or DSC signal and a U/B converting portion 64 carries out a U/B conversion, and outputs the result. Further, a DSC separating portion 65 separates the order signal between the specified stations and the system control signal, ]nd a switch control portion 66 controls the switch 67 by the system control signal to switch the main circuit and the protecting circuit.

Here, the order-wire signal for all stations is used as an ASC signal, and, the DSC signal, is formed by multiplexing a plurality of order-wire signals between specified stations having different combinations of the stations to be used, and the system control signal used only between a transmitting terminal station and a receiving terminal station in which the system is switched.

In FIGS. 9A~9C, DSC signals are branched and inserted in each station, and thus the reliability thereof is decreased at each station. Therefore, the reliability of the system control signal multiplexed in the DSC signal also decreased, so that a problem of a higher probability of an error occurring in the system control is increased.

To solve the above-mentioned problem, in the present invention, a first auxiliary signal which is required only in the transmitting station and the receiving station, such as used in the system control signal, and a second auxiliary signal required in the intermediate station(s), are separated in different time slots, and in the intermediate station, only the second auxiliary signal is branched and inserted.

That is, the intermediate station does not branch or insert the first auxiliary signal, and thus the first auxiliary signal inserted in a time slot can be transmitted without any decrease in reliability.

Figure 10A:
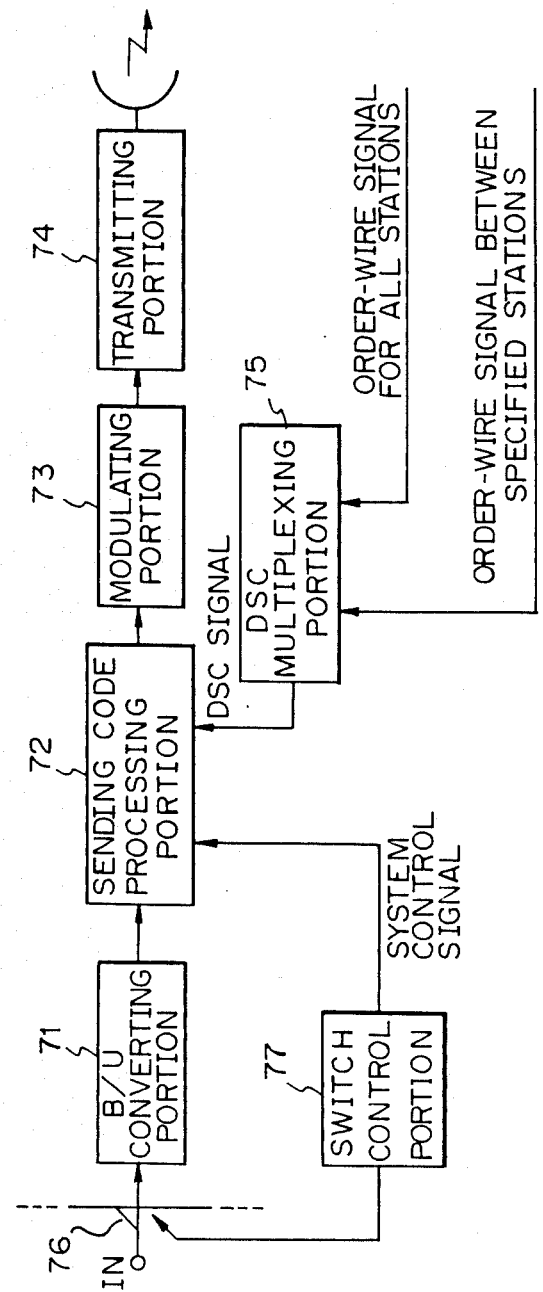
Figure 10B:
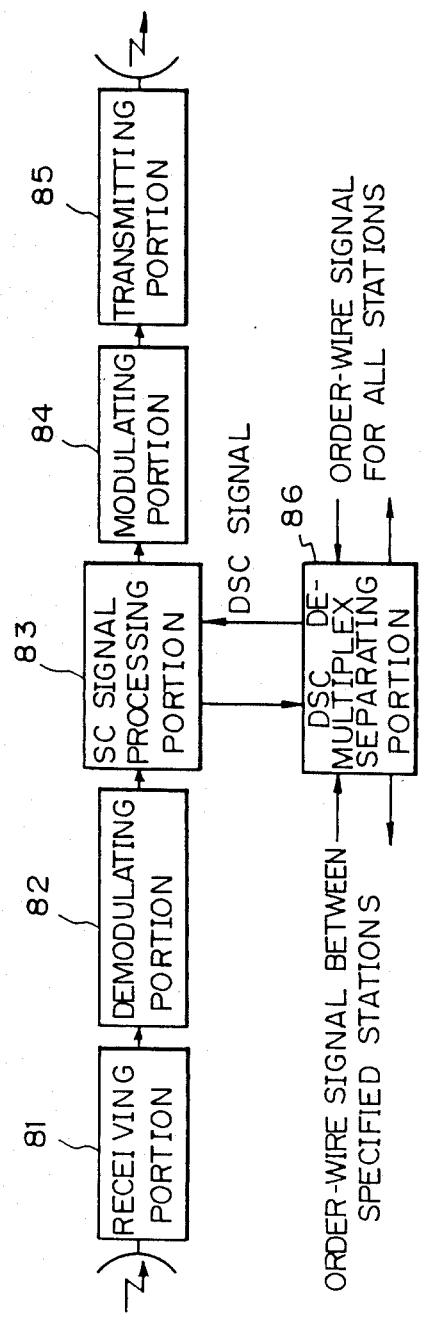

FIGS. 10A~10C are block diagrams of an auxiliary signal transmission system of another embodiment of the present invention.

In FIGS. 10A~10C, a B/U conversion portion 71, sending portions 74, 75, switches 76, 97, switch control portions 77, 96, and receiving portions 81, 91 have the same function as shown in FIGS. 9A~9C, and therefore, the explanation hereof is omitted.

The difference between FIGS. 9A~9C and FIGS. 10A~10C lies in the following. In a sending code processing portion 72 and a receiving code processing portion 93, a system control signal as a first auxiliary signal and a DSC signal as a second auxiliary signal are treated as different signals, and are inserted or branched by using different time slots. In a DSC multiplexing portion 75, a DSC demultiplex and separating portion 86, and a DSC separating portion 95, instead of a system control signal, a digital order signal for all stations is multiplexed and demultiplexed with an order signal for a specified station. Further, an ASC signal is not modulated and demodulated in modulating portions 73, 74 and demodulating portions 82, 83.

Because, the system control signal is not separated or inserted in the intermediate station,. shown in FIG. 10B, reliability is improved. Further, instead of the system control signal, the order signal for all stations is multiplexed as a DSC signal, and therefore, it is not necessary to FM modulate the carrier wave due to the ASC signal, as in the prior art. Accordingly, a precise carrier wave regeneration can be carried out so that the receiving error rate is reduced.

As mentioned above, according to the present invention, the auxiliary signal which is necessary in the transmitting station and the receiving station can be transmitted without decreasing the reliability of the operation, and t e error probability in the system control can be decrease. Thus, the reliability of the whole system is improved.

What is claimed is:

1. A system for transmiiting auxiliary signals used in a multiplex communication system which includes a transmitting terminal, at least one intermediate repeater station and a receiving terminal, said multiplex communication system transmitting a main signal together with said auxiliary signals using a plurality of channel, each comprising a plurality of time slots, for transmitting said auxiliary signals together with said main signal, said system comprising:

means for separating said auxiliary signals in the transmitting terminal into a first auxiliary signal required only in the transmitting and receiving terminals and a second auxiliary signal required in the at least one intermediate repeater station;

means for inserting said first auxiliary signal, output by said separating means, separately from said second auxiliary signal into said main signal in the transmitting terminal;

means for transmitting said first auxiliary signal without manipulative processing of said first auxiliary signal in the intermediate repeater station; and means for processing said second auxiliary signal in the intermediate repeater station, and after processing said second auxiliary signal, transmitting said second auxiliary signal from the intermediate repeater station towards the receiving terminal.

2. A system for transmitting auxiliary signals used in a multiplex communication system according to claim 1, wherein said inserting means inserts said first auxiliary signal into one of the channels and said second auxiliary signal into a different one of said channels.

3. A system for transmitting auxiliary signals used in multiplex communication system according to claim 1, wherein said inserting means comprises:

means for inserting said first auxiliary signal into said main signal in a first one of the channels and said second auxiliary signal into said main signal in third and fourth channels;

first and second signal processing portions for adding a digital service channel synchronizing signal to said first auxiliary signal and to said second auxiliary signal, respectively; and means for inserting said first and second auxiliary signals into said main signal in the first channel and the third and fourth channels to be output, respectively, and further comprising in the intermediate repeater station:

repeating means for repeating said first auxiliary signal without signal processing;

signal processing means for taking out and processing said second auxiliary signal from the third and fourth channels; and an inserting portion for inserting said second auxiliary signal into said main signal in the third and fourth channels.

4. A system for transmitting auxiliary signals used in a multiplex communication system according to claim 1, wherein said first auxiliary signal is sent by using a first time slot in one channel and said second auxiliary signal is sent by using second time slots different from said first time slot, and further comprising means in the intermediate repeater station for branching and inserting only said second auxiliary signal in the second time slots.

* * * * *